Dec. 13, 1960  P. J. RAWSON ET AL  2,964,061
MULTI-WAY FLUID SELECTOR VALVES
Filed Nov. 21, 1957  2 Sheets-Sheet 1

Inventors:
Peter John Rawson
Duncan Chisholm
By:
Stevens, Davis, Miller & Mosher
Attorneys United States Patent Office 2,964,061
Patented Dec. 13, 1960

2,964,061

MULTI-WAY FLUID SELECTOR VALVES

Peter John Rawson and Duncan Chisholm, Whetstone, England, assignors to The English Electric Company Limited, London, England, a British company Filed Nov. 21, 1957, Ser. No. 698,008

Claims priority, application Great Britain Nov. 28, 1956

4 Claims. (Cl. 137—627)

This invention relates to multi-way fluid selector valves.

According to the invention a multi-way selector valve comprises, in combination, a valve housing having a first group of ports, a second smaller group of ports, and a single port, a first selector member within the housing for connecting any specified sub-group of ports within the first group of ports, corresponding in number to the second smaller group of ports, to the single port, and a second selector member within the housing for connecting the individual ports of any specified sub-group of ports within the first group of ports separately to the individual ports of the second smaller group of ports.

According to a preferred feature of the invention, the selector members are arranged for rotary movement about a common axis, the first group of ports being positioned in a face of the valve housing normal to the common axis of the selector members on at least one circle concentric with the common axis.

Figure 1:
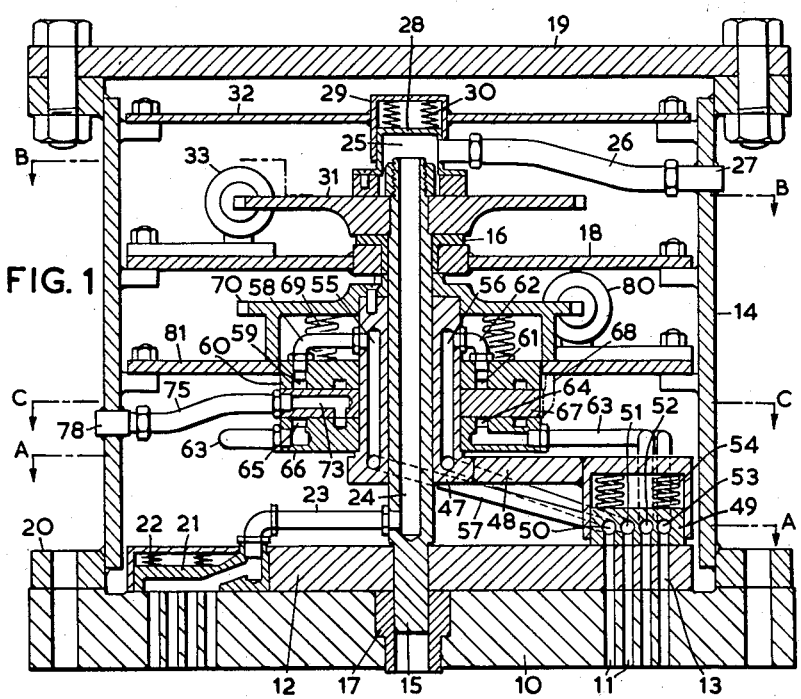
Figure 2:
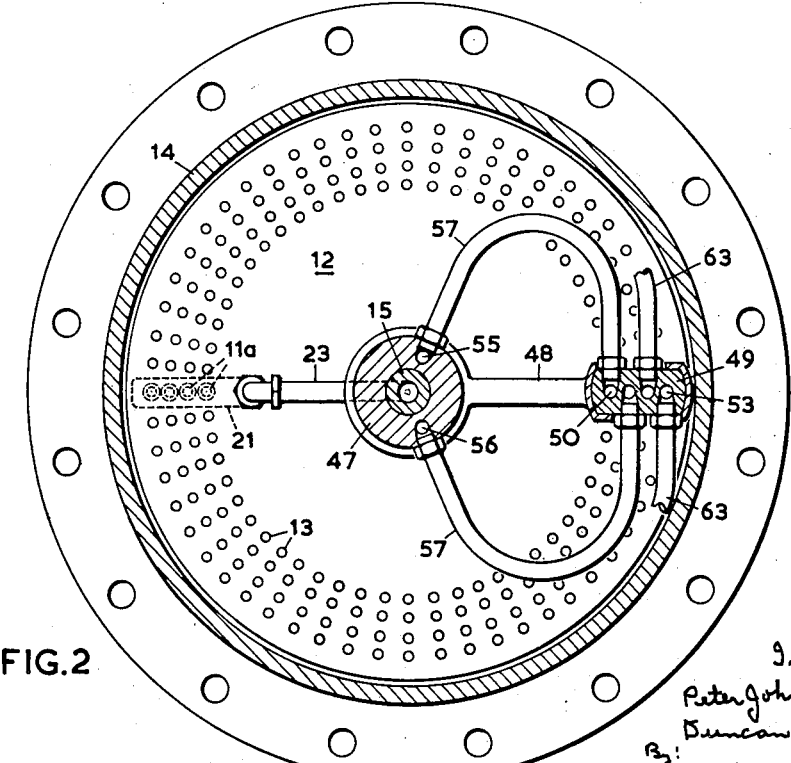
Figure 3:
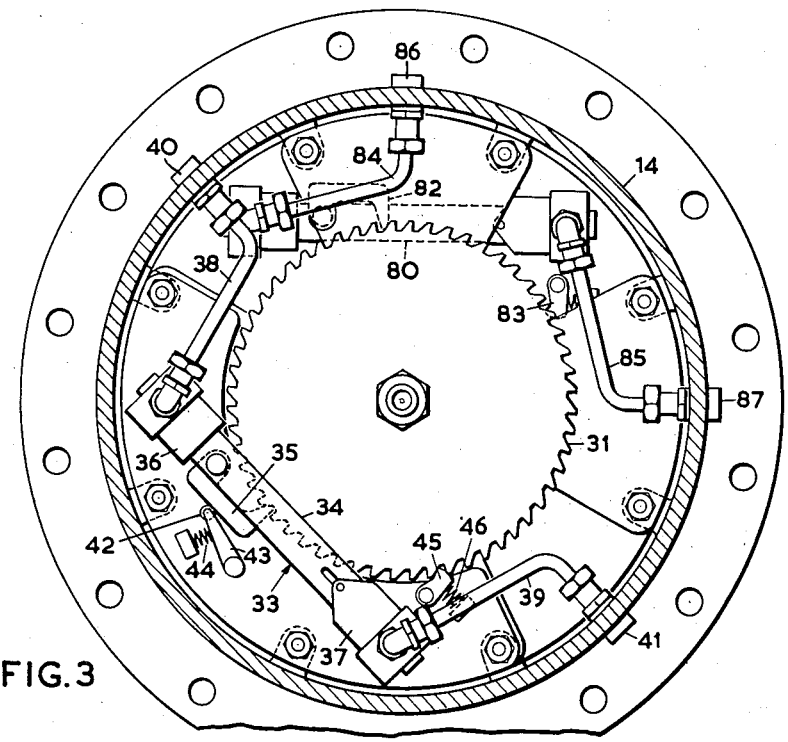
Figure 4:
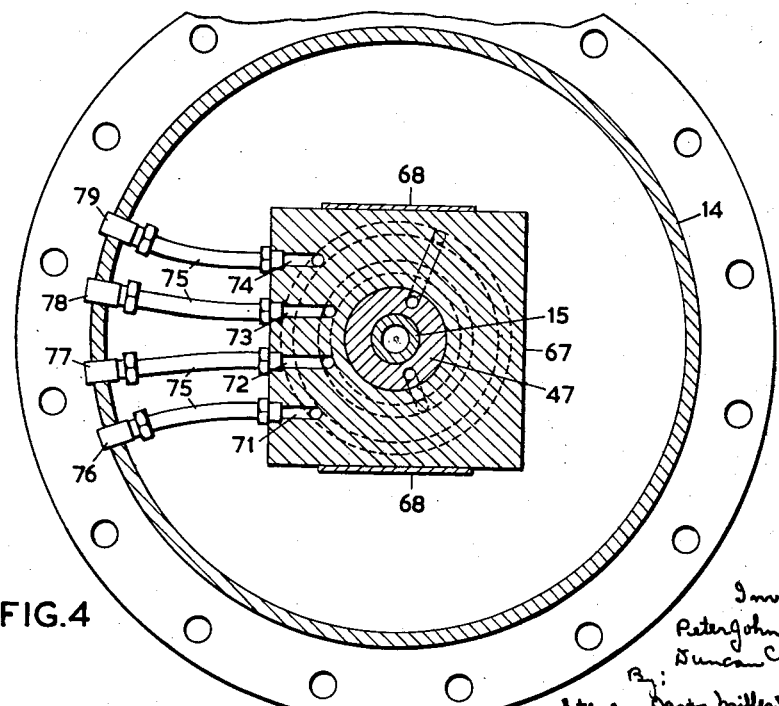

Further preferred features of the invention will appear from the following description with reference to the accompanying drawings where there is shown one form of selector valve according to the invention. Fig. 1 is a sectional elevation through the valve, whilst Figs. 2-4 show sectional plans taken on the lines AA, BB and CC of Fig. 1 respectively.

Referring now to the drawings, the base of the valve is indicated at 10 and has two hundred and twenty-four ports 11 therein spaced around four concentric circles. The first selector member is indicated at 12 and consists of a disc having "through" ports 13 therein corresponding in number and spacing to the ports 11 in the base of the valve.

The selector 12 is enclosed in a casing 14 and is carried by a shaft 15 journalled at its upper end in a bearing bush 16 and at its lower end in a bearing bush 17. The bearing bush 16 is carried by a cross-plate 18 secured to lugs on the inside of the casing 14 whilst the bearing bush 17 is carried by the base 10. The casing 14 is closed at the top by a cover plate 19 and has a flange 20 at its lower end for securing the casing to the base 10.

Slidably mounted in the selector 12 is a collector chamber 21 which is biased by means of springs 22 into engagement with the top face of the base 10. The collector chamber is arranged to cover four radially aligned ports 11 in the base 10 and is connected by means of a flexible pipe 23 to the lower end of an axially extending duct 24 in the shaft 15. The upper end of this duct communicates with a chamber 25 which is in turn connected via a flexible pipe 26 to a union 27 in the wall of the casing 14. The chamber 25 is sealed off from the interior of the casing 14 by means of a flanged cup 28 which slides in a housing 29 and is biased by means of springs 30 so that its lower face forms a seal with a ratchet wheel 31 secured to the shaft 15. The housing 29 is secured to a cross-plate 32 which is in turn mounted on lugs on the inside of the casing 14.

The selector 12 is rotated in steps equal to the angular spacing of the ports 11 by means of a pneumatic actuator generally indicated at 33 in Fig. 3. The actuator is mounted on the cross plate 18 and comprises a double-ended piston 34 carrying a pawl 35, and two cylinders 36 and 37 respectively. The piston is biased to the position shown in Fig. 3 by means of springs within the cylinders and the two cylinders are connected by means of pipes 38 and 39 to unions 40 and 41 respectively in the casing 14. A roller 42, carried by a pivoted arm 43, is biased by means of a spring 44 into engagement with the pawl 35 so as to maintain the pawl in engagement with the ratchet wheel 31. A further pawl 45 is biased by a spring 46 into engagement with the ratchet wheel so as to provide a positive location at each angular position.

To rotate the selector 12 one step, the cylinder 36 is momentarily connected to a source of pressure whilst the cylinder 37 is momentarily connected to exhaust. The ratchet 35 is then returned to the position shown by connecting the cylinder 37 momentarily to the source of pressure and the cylinder 36 to exhaust, this sequence being repeated for each succeeding step. With the selector 12 in the position shown, the four radially aligned ports indicated at 11a in Fig. 2 are connected to the union 27. By moving the selector 12 to the appropriate angular position, any other group of four radially aligned ports may be connected to the union.

Rotatably mounted on the shaft 15 is a hollow shaft 47. This shaft has attached thereto a radial arm 48 in which is mounted the second selector member 49 having four collector ducts 50—53 therein. This selector is biased into engagement with the upper face of the first selector 12 by means of helical compression springs 54.

The collector ducts 50 and 51 are connected to vertical ducts 55 and 56 respectively in the hollow shaft 47 by means of flexible pipes 57. The upper end of the duct 55 is connected by means of a flexible pipe 58 to an annular groove 59 in a disc 60 slidably mounted on the hollow shaft 47 but arranged for rotation therewith. The duct 56 is similarly connected to an annular groove 61 in the disc 60 by means of a flexible pipe 62. For purposes of illustration, both of the ducts 55 and 56 are shown in section in Fig. 1, but it will be appreciated that in a true sectional elevation neither duct would be seen.

The collector ducts 52 and 53 are connected by a flexible pipes 63 to annular grooves 64 and 65 respectively in a further disc 66 secured to the hollow shaft 47. Interposed between the two discs 60 and 66 is a floating plate 67 which is held against rotation by guide members 68 (see Fig. 4). The two discs are held firmly in contact with the opposite faces of the floating plate 67 by means of helical compression springs 69 which bear, on the one hand, against the lower surface of a ratchet wheel 70 attached to the hollow shaft 47 and, on the other hand, against the upper surface of the disc 60. Four ducts 71–74 in the floating plate are arranged to lead one to each of the annular grooves and each duct is connected by a flexible pipe 75 to separate unions 76–79 in the casing 14.

The selector 49 is rotated in steps equal to the angular spacing of the ports 11 by means of a pneumatic actuator 80 which is similar in all respects to the actuator 33 and which is mounted on a cross-plate 81 in turn mounted on lugs on the inside of the casing 14. The pawl 82 of this actuator engages the ratchet wheel 70 whilst a further pawl 83 provides a positive location at each angular position. This actuator is arranged to rotate the ratchet wheel 70 in the opposite direction to the ratchet wheel 41. The feed pipes 84 and 85 for this actuator are connected to unions 86 and 87 respectively.

With the selector 49 in the position shown in Fig. 2, the four ports 11a in alignment with the selector will be connected to the unions 76–79 respectively. By moving the selector to the appropriate angular position, any other group of ports may be connected individually to the corresponding unions.

What we claim as our invention and desire to secure by Letters Patent is:

1. A multi-way selector valve comprising, in combination, a valve housing having a first group of ports, a second smaller group of ports, and a single port, a first selector member within the housing for connecting any specified sub-group of ports within said first group of ports, corresponding in number to said second smaller group of ports, to said single port, and a second selector member within said housing for connecting the individual ports of any specified sub-group of ports within said first group of ports separately to individual ports of said second smaller group of ports.

2. A multi-way selector valve according to claim 1, wherein said selector members are arranged for rotary movement about a common axis, said first group of ports being positioned in a face of said valve housing normal to said common axis on at least one circle concentric with said common axis.

3. A multi-way selector valve according to claim 2, wherein said first selector member comprises a disc arranged for movement over said face in said valve housing, the disc being provided with a separate through port for each of the ports in said face except those of one sub-group, and with a collector chamber arranged to cover all the ports in the sub-group, the collector chamber being arranged to communicate with said single port.

4. A multi-way selector valve according to claim 3, wherein the second selector member is arranged for rotary movement over the face of said disc remote from said face in said valve housing and is provided with a separate duct for each individual port within said sub-group, each of said ducts being arranged to communicate with a port of said second smaller group of ports.

References Cited in the file of this patent

UNITED STATES PATENTS

| | | |
|---|---|---|
| 616,827 | Deisher | Dec. 27, 1898 |
| 1,842,382 | Arey | Jan. 26, 1932 |
| 2,024,690 | Harris | Dec. 17, 1935 |
| 2,538,215 | Stack | Jan. 16, 1951 |
| 2,688,982 | Withworth | Sept. 14, 1954 |
| 2,831,651 | Hutchings | Apr. 22, 1958 |